United States Patent Office 3,145,332
Patented Aug. 18, 1964

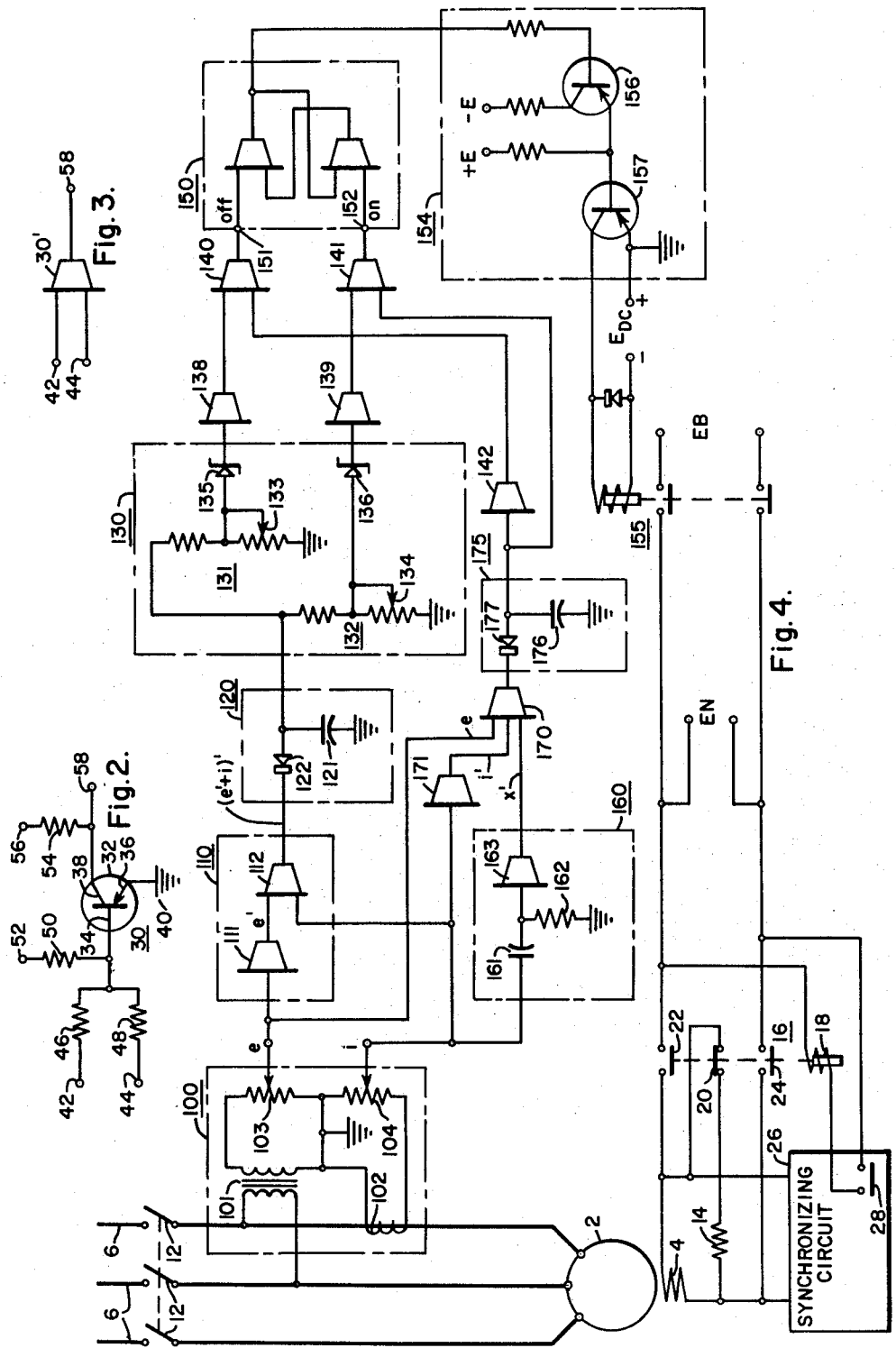

3,145,332
POWER FACTOR SENSING SYSTEM FOR SYNCHRONOUS MACHINES
Dean J. MacGregor, Amherst, N.Y., assignor to Westinghouse Electric Corporation, East Pittsburgh, Pa., a corporation of Pennsylvania
Filed Feb. 15, 1961, Ser. No. 89,494
28 Claims. (Cl. 318—179)

The present invention relates generally to power factor sensing systems and more particularly to a power factor sensing circuit for preventing pull-out of a synchronous dynamoelectric machine.

Excitation voltage supplied by rectifier means to a synchronous machine has the inherent disadvantage of the pull-out torque decreasing with the square of any supply voltage dip. In contrast, rotating apparatus supplying excitation to a synchronous machine is capable of maintaining the level of excitation through some supply voltage transients due to the inertia of the rotating patrs. The present invention overcomes the disadvantage of rectifier excitation by maintaining or increasing the excitation to the synchronous dynamoelectric machine through periods of transient overload or transient fluctuations of line voltage. The present invention may be used to sense synchronous motor pull-out and, when desirable, prevent synchronous motor pull-outs caused by momentary overloads or voltage dips on the power supply.

The principal object of the present invention is to provide a power factor sensing circuit for determining the magnitude of deviation of the power factor from a predetermined reference such as unity and for determining whether the power factor is leading or lagging.

Another object of the present invention is to provide a power factor sensing circuit using coincident pulse techniques to provide a voltage proportional to the deviation of the power factor from a predetermined reference.

Another object of the present invention is to provide a power factor sensing circuit using coincident pulse techniques to produce a voltage proportional to the deviation of the power factor from a predetermined reference and differentiating techniques to determine whether the power factor is leading or lagging.

A more specific object of the present invention is to provide a power factor sensing circuit in a synchronous motor control capable of monitoring the power factor of the alternating current supply to the synchronous motor and provide corrective signals when the power factor deviates from a predetermined reference to predetermine extremes.

Further objects and advantages of the present invention will be readily apparent from the following detailed description taken in conjunction with the drawings, in which:

FIGURE 2 is a schematic diagram of a typical circuit element which may be utilized to perform a logic function used in this invention;

FIGURE 3 is a symbolic representation of the logic element illustrated in FIGURE 2; and FIGURE 4 is a schematic diagram of the illustrative embodiment shown in FIGURE 1.

Figure 1:
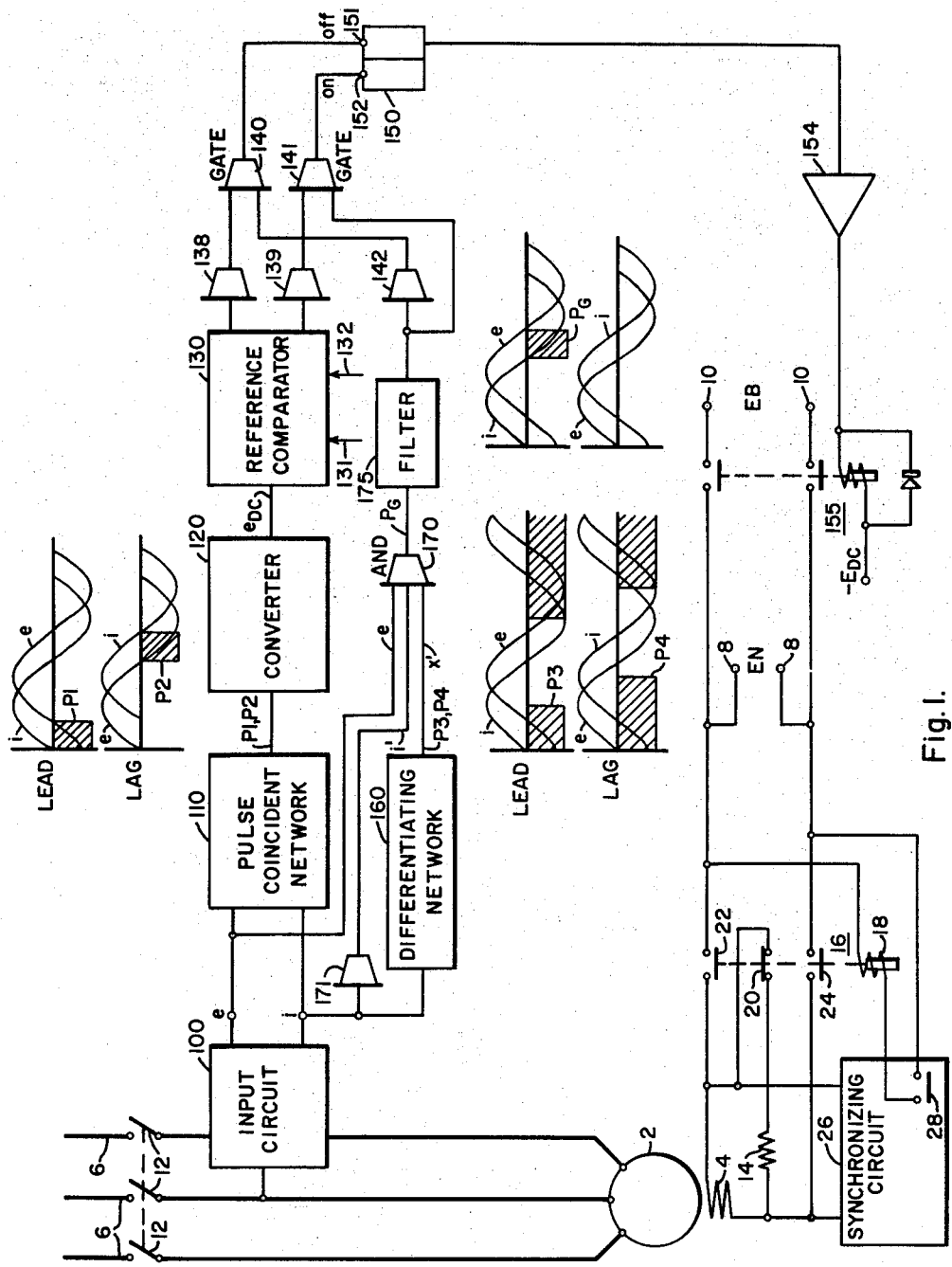
FIGURE 1 is a block diagram of an illustrative embodiment of the present invention with waveforms at progressive stages indicated thereon.

The invention is shown embodied in an electrical control system for a synchronous motor 2 having a field winding 4. The laternating current power supply is indicated by the power supply leads 6 while the normal direct current excitation supply, EN, is represented by the leads 8. A boost excitation source EB at terminals 10 is adapted to be connected to the field winding 4 as will be more fully described hereinafter.

The blocking action of the rectifiers prevents flow of current between the two sources if they are rectifier power supplies. If the supplies are machines a blocking diode is needed to prevent the flow of reverse currents.

For purposes of clarity, an explanation is offered as to how the synchronous motor is brought up to synchronous speed after which the power factor sensing circuit in accordance with the present invention will be described. The synchronous motor 2 is started by energizing its stator by means of closing the line contactors 12 to the alternating current power supply 6. At the same time the field winding 4 is short circuited through a discharge resistor 14 by means of a field contactor 16 having an operating coil 18 and a normally closed contact 20, as well as normally open contacts 22 and 24. When the motor reaches the desired speed for synchronism as determined by the synchronizing circuit 26 the normally open contacts 28 will close thereby energizing the operating coil 18. The normally open contacts 22 and 24 will close thereby connecting the normal excitation source EN to the field winding 4 while the opening of the normally closed contact 20, an instant after the closure of contacts 22 and 24, removes the short circuit connection of the field winding 4. In such a manner the synchronous motor is pulled into step and operates at synchronous speed.

A synchronous motor may pull out of synchronism due to a variety of causes, including excessive load, reduced line voltage, and loss of field current. Synchronous motors are generally designed to operate at unity power factor or a selected lagging or leading power factor, usually 80% leading. For purposes of clarity a unity power factor type synchronous motor has been illustrated.

The present invention senses the deviation from unity of the power factor of the synchronous motor 2 and determines whether the power factor is leading or lagging. Should the deviation of power factor from unity exceed a preset limit, denoting the existence of pull-out conditions, usable output signals are derived to signal or initiate corrective action. Of course, the present invention is capable of sensing power factor of any alternating current line and its use is not limited to applications to synchronous motor pull-out circuits alone.

The present invention utilizes NOR logic blocks to perform various logic functions such as NOR, AND and FLIP-FLOP, as well as gating. One such form of NOR element is shown in an article entitled, "Static Switching Devices," by Robert A. Mathias, in "Control Engineering," May 1957. Of course, any suitable form of NOR element may be used. FIGURE 2 is provided to illustrate a typical NOR logic block indicated at 30. The NOR logic block 30 comprises a transistor of suitable type herein shown of the PNP type and indicated by the reference character 32. The transistor 32 has a base electrode 34, an emitter electrode 36 and a collector electrode 38. The emitter electrode 36 is connected to ground potential indicated at 40. The base electrode 34 is connected to a plurality of input terminals 42 and 44 through respective isolating impedances 46 and 48. Any number of input terminals and isolating impedances may be used. A biasing resistor 50 connects the base electrode 34 to a positive potential source 52 while a current limiting resistor 54 connects the collector electrode 38 to a negative power source 56. The collector electrode 38 is also connected to an output terminal 58.

In operation, the positive power supply 52 biases the transistor 32 to cut off through the resistor 50. If no signal is present at the input terminals 42 and 44, the transistor 32 is non-conductive and an output will appear at the terminal 58 which will be approximately the value of the potential of the negative power supply 56. If a negative potential signal is applied to one or more of the input terminals, the transistor 32 becomes highly conductive simulating a switch in the closed position, and effectively grounding the output terminal 58 so there will be no output at that terminal.

For purposes of clarity the NOR logic block 30 is presented throughout by the symbolic representation 30' shown in FIG. 3.

The NOR static circuitry 30' shown in FIG. 3 is also utilized as an AND logic block since the absence of an input signal at the terminal 42 and the absence of an input signal at the terminal 44 will result in an output signal at the output terminal 58. A three input terminal AND logic block requires merely another input terminal and isolating impedance. The NOR logic circuitry 30' is adaptable to provide a gating function since the absence of an input signal at terminal 42 will allow an output signal at the output terminal 58 unless an input or gating signal is present at the other input terminal 44. A FLIP-FLOP or memory element, is constructed by the cross-connection of the outputs and inputs of two NOR elements. The resulting FLIP-FLOP element is a bistable device which is capable of being triggered to assume one output state and remain in that output state even after removal of the triggering influence. In response to a first condition, the FLIP-FLOP element provides an output which is maintained even though the first condition thereafter is discontinued. The FLIP-FLOP element will assume its opposite state when a second input is applied to it and will remain in the second state even after removal of the second input. In other words, the element is reset and the output terminated in response to a second condition.

Referring to the block diagram shown in FIG. 1 an input circuit 100 is adapted to sense the line to line voltage and the line current and provide to a pulse coincident network 110 a first input $e$ small magnitude but in phase with the line to line voltage and a second input $i$ of small magnitude in phase with the line current. The time difference between the inputs is the deviation of the power factor from unity. The inputs $e$ and $i$ are applied to the pulse coincident network 110 in such a manner as to provide an output pulse of constant magnitude and having a width proportional to the time difference between the input waves $e$ and $i$. The pulse coincident network is chosen so that a pulse output results when the first input signal, $e$, is of negative polarity and the second input signal, $i$, is of positive polarity. It can be seen from the associated waveforms that a pulse output P1 will result when the power factor is leading and a pulse output P2 results when the power factor is lagging. The resultant output pulse is supplied to a converter 120 which provide an analog signal $e_{dc}$, having a magnitude proportional to the deviation of the power factor from unity.

A reference comparator 130 compares the deviation of power factor from unity as indicated by the analog signal $e_{dc}$ with preset values 131 and 132. The first preset value 131 establishes the limits of power factor deviation from unity when lagging, which when exceeded will result in an input signal to a NOR element 139. The second preset 132 establishes the limits of leading power factor from unity, which when exceeded provides an input to a NOR element 138.

As discussed previously the absence of any input to the NOR element 138 will result in an output signal which is connected to a first gating means 140. The output signal from the NOR element 139 is connected to a second gating means 141.

The gating means 140 and 141 are controlled by a gating signal which is present on either gating means 140 or 141 depending upon whether the power factor is leading or lagging. The obtaining of the gating signal will be described in more detail hereinafter.

An output means 150 is connected to the gating means 140 and 141 and comprises a FLIP-FLOP or memory element having a first input means 151 and a second input means 152, "off and on" respectively. Should the last input be one that appears at the input means 151 the output means 150 will assume its "off" state. Should the last input signal appear at the input means 152 the output means 150 will assume its "on" state. It will be shown hereinafter that an input to the input means 152 indicates that the power factor is deviating from unity sufficiently to exceed the preset limit 131 and the sense of the power factor is lagging. Hence the output means provides a signal to amplifier means 154 which in turn energizes a second field contactor 155 closing its normally open contacts and thereby connecting the boost excitation source EB to the field winding 4. As a result the excitation to the field winding 4 increases and the motor torque increases accordingly. If the deviation from unity of the power factor in the lagging sense is due to a mechanical overload and is not excessive, pull-out of the synchronous motor 2 can thus be avoided.

Since the reference comparator 130 will provide an input signal to the NOR element 138 and NOR element 139 when the digital voltage $e_{dc}$ exceeds the preset values 131 and 132 it is necessary that the gating means 140 and 141 be controlled by a gating signal which is determined by the sense of the power factor, that is, leading or lagging.

Accordingly, a differentiating circuit 160 is adapted to provide a first input signal $x'$ to an AND element 170 when the second input $i$ is rising; that is when the derivative $$\frac{di}{dt}$$

is of positive numerical sense. A second input signal to an AND element 170 is provided by connecting the first input $e$ thereto. A third input signal to the AND element 170 is provided through a NOR element 171 which receives the second input $i$. It can be seen that the first input signal to the AND element 170 will be a pulse P3 when the power factor is leading or a pulse P4 when the power factor is lagging. The three input signals $x'$, $e$ and $i'$ to the AND element 170 are simultaneously present only when the derivative of the line current is of positive numerical sense, the line current is of positive polarity and the phase voltage is of negative polarity. Accordingly, a gating signal $P_G$ will result only when the derivative of the line current is of a negative numerical sense, the line current is of negative polarity and the phase voltage is of positive polarity. Stated another way, the gating signal $P_G$ results from the AND element 170 when the power factor is of a leading sense. Boolean algebra notation has been used to designate the input signals as an aid to clearer understanding.

A filter network 175 filters the gating signal $P_G$ to maintain a continuous gating signal to the second gating means 141 and a NOR element 142 over a full cycle of the supply frequency. Without this filter a gating signal $P_G$ would be present only during a relatively short period of time. Since the outputs from NOR blocks 138 and 139 are continuous, erroneous operation would occur. Hence, the gating signal $P_G$ is converted to a steady voltage by a capacitor 176, grounded on one side. A diode 177 prevents the capacitor 176 from discharging to ground when the transistor in the NOR element 170 becomes conducting.

When the filtered gating signal $P_G$ is provided to the second gating means 141, the gate is blocked allowing no output signal from the reference comparator 130 to reach the input means 152. This is as it should be since the power factor is sensed to be leading and no signal indicating excessive lagging power factor should be allowed to the output means 150.

The filtered gating signal $P_G$ is also supplied to a NOR element 142 which in turn opens the first gate means 140 allowing a signal from the reference comparator 130 to the output means 150 indicating the deviation of the power factor from unity exceeds the preset limit determined by the preset 132 and is of a leading sense.

In the absence of a gating signal $P_G$ from the AND element 170 it can be seen that an output results from the NOR element 142 which output indicates a lagging power factor and therefore closes or blocks the first gating means 140. However, the gating means 141, having no gating signal $P_G$ thereon to block the application of an input from the reference comparator 130 to the input means 152, allows such an input to the input means 152 should the deviation of power factor from unity exceed the preset reference value as determined by the preset 131.

More particularly, referring to the schematic diagram shown in FIG. 4 the input circuit 100 comprises a potential transformer 101 connected to sense the line to line voltage and a current transformer 102 connected to sense the line current. A potentiometer 103 provides a portion of the magnitude of the voltage signal in phase with the line to line voltage and hence the first input $e$. A second potentiometer 104 provides a portion of the output voltage of the current transformer 102 as the second input $i$.

The input signals $e$ and $i$ are applied to the pulse coincident network 110 which comprises NOR logic blocks 111 and 112. These logic blocks are each such that if there are no negative voltages applied to any input, there will be a negative output voltage; if, however, a negative voltage is applied to any input, the output goes to ground potential. When the first input $e$ is positive logic block 111 has an output which keeps the NOR logic block 112 at zero output. Also, a negative input $i$ prevents an output from the NOR block 112. Thus, the NOR block 112 can only have an output when the first input $e$ is negative and the second input $i$ is zero or positive. Using Boolean notations, an output from NOR block 112 results when $(e'+i)'$, which equals $ei'$.

The resultant pulses indicated as P1 and P2 in FIG. 1 are connected to the converter 120. The converter 120 is a pulse width to voltage converter which stores the pulses P1 and P2 on a capacitor 121 to produce an analog voltage output $e_{dc}$ proportional to the deviation of the power factor from unity. A rectifier 122 prevents capacitor 121 from discharging through NOR 112.

The analog voltage $e_{dc}$ is applied to the reference comparator 130 which comprises two adjustable voltage dividers as the presets 131 and 132 respectively. Each voltage divider is provided with a sliding tap 133 and 134 respectively to control the magnitude of voltage appearing across the Zener diode 135 and 136 respectively. Each sliding tap 133 and 144 can be set independently.

It is to be understood that a Zener diode is a semiconductor rectifier, usually a silicon diode, which has the characteristic of blocking current flow in one direction when the voltage is below a predetermined breakdown value while current is permitted to flow freely when the voltage is above a predetermined value. The breakdown is non-destructive so the current is cut off when the voltage again drops below the breakdown value. Of course any device with a breakdown region as described can be used. Accordingly, a voltage across the Zener diode 135 sufficient to cause its breakdown is provided when the analog voltage $e_{dc}$ exceeds the first preset reference 131 determined by the positioning of the tap 133. In the same manner the Zener diode 136 is caused to breakdown when the analog voltage $e_{dc}$ exceeds the second reset 131. The breakdown of Zener diode 135, indicating the preset deviation for leading power factor has been exceeded, removes the output from the NOR element 138. An output from the NOR gate 140 to the first input means 151 will result unless the power factor sense is lagging. If the power factor sense is lagging the gate signal $P_G$ from the AND element 170 to the NOR element 142 is absent thereby allowing an output signal from the NOR element 142 closing the gate 140 and indicating a lagging power factor.

Should the analog voltage $e_{dc}$ be of sufficient magnitude to cause breakdown of the Zener diode 136 the NOR element 139 will provide no input to the second gating means 141 thereby resulting in an output from the NOR gate 141 unless the gating signal $P_G$ is present indicating a leading power factor sense.

As described previously an input to the first input means 151 will cause the output means to assume an "off" output condition and an input to the second input circuit means 152 will cause the output means to assume an "on" output condition.

Should the output means 150 assume an "on" output condition, the output signal is amplified by the amplifier 154. It can be seen from FIG. 4 that the amplifier 154 comprises transistors 156 and 157 connected in a cascade ararngement to connect the power supply, $e_{dc}$, to the field contactor 155 with the resulting correction action as described hereinbefore with reference to FIG. 1.

It is now in order to describe in further detail the means for sensing whether the power factor is leading or lagging and for providing the gating signal $P_G$. The differentiating network 160 comprises a capacitor 161 and a resistor 162 serially connected to ground. The resultant input to the NOR block 163 is the derivative $x$ of the line current with respect to time. When the derivative $x$ is negative the output of the NOR element 163 will be blocked or grounded. The NOR block 163 has an output only when the slope of the current wave is positive as indicated by the shaded pulses P3 and P4 shown in FIG. 1. The output $x'$ from the slope measuring network 160, the output $i'$ from the AND logic block 171 and the input $e$ are applied to the AND logic block 170 which has a negative output only if its three inputs are simultaneously absent. As discussed hereinbefore the resultant output signal $P_G$ from the AND element 170 indicates a power factor of a leading sense. Using Boolean notation, an output $P_G$ from AND element 170 results when $(e+i'+x')'$, which equals $e'ix$.

An examination of the wave shapes when the gating signal $P_G$ is present (FIG. 1) shows that the AND block 170 has a negative output only if three conditions are met:

(1) The slope of the line current $$\left(\frac{di}{dt}\right)$$

must be negative.

(2) The line voltage must be of positive polarity.

(3) The line current must be of negative polarity.

The above set of conditions can only be met when the power factor is of a leading sense. The output signal from the AND element 170 is used to block the second gate 141 so that no signal can be passed to the output means 150 when the power factor is of a leading sense. Similarly the NOR logic block 142 has no output when the power factor is leading, but does block the first gating means 140 during lagging power factor.

The result of this action is:

(1) A leading power factor applies an input to the gating means 141 preventing all output therefrom. Also a leading power factor prevents an output from the NOR block 142, but the output of NOR block 138 keeps the output of the gating means 140 at ground potential. In other words no output results from the gating means 140. When the power factor becomes sufficiently leading to exceed the preset 131 causing breakdown of the Zener diode 135, the NOR block 138 goes to zero output and the gating means 140 produces an output which turns "off" the FLIP-FLOP or output means 150.

(2) A lagging power factor causes the output of the AND element 170 to be zero thus allowing an output from the NOR block 142. A lagging power factor thus prevents all outputs from the first gating means 140, but only the output of NOR block 139 prevents an output from the second gating means 139. When the power factor sufficiently deviates from unity to exceed the lagging preset reference 132 as determined by the setting of the sliding contact 134, causing breakdown of the Zener diode 136, the output of NOR block 139 goes to zero thereby allowing an output from the gating block 139 to turn "on" the FLIP-FLOP or output means 150.

To prevent unnecessary synchronous motor pull-outs the circuit would operate in the following manner. Assume the motor 2 is running synchronized carrying full mechanical load at a normal unity power factor. Suddenly the load torque increases somewhat above the pull-out torque and the power factor shifts to lagging and begins to increase toward pull-out. When the power factor reaches the preset magnitude for deviation in the lagging sense, the Zener diode 136 conducts and the output of the second gating means 141 switches the FLIP-FLOP 150 to its "on" output position and energizes the control relay 155 through the amplifying transistors 156 and 157. The closed contacts of the control relay 155 apply additional voltage, a boosting potential EB, to the motor field thereby increasing the field excitation and motor torque. If the mechanical overload on the synchronous motor 2 is not excessive pull-out will thus be avoided.

When the mechanical load is reduced to normal the power factor becomes less lagging and the output from the gating means 141 is returned to zero. This, however, leaves the FLIP-FLOP 150 in its "on" output state. Because of the extra field excitation the synchronous motor 2 draws power at a more leading power factor than normal which will cause the Zener diode 135 to conduct and gate 140 to have an output. This turns off the FLIP-FLOP output 150 and opens the relay 155 restoring normal excitation to the field winding 4.

Similar action would take place if the dip in supply voltage caused a reduction in motor torque. Note that it is necessary to protect the motor field winding 4 to prevent applying overvoltage for so long as to cause overheating. This can be accomplished by a time delay which would switch the FLIP-FLOP 150 to its off state after a predetermined time. Such a time delay may be accomplished with a capacitor charging circuit or thermistor heating circuit associated with the thermal capacity of the field winding 4. An appropriate overload relay in the field circuit may also be used to accomplish this purpose.

Thus, it is readily apparent that the present invention has provided a power factor sensing circuit which is capable of utilizing the short time overload capabilities of a synchronous motor machine. Major applications have been found where the load torque requirements fluctuate such as compressors, ball mills, and the like. It is readily applicable in locations subject to brief supply voltage dips with a resultant reduction in motor torque.

Various modifications are possible within the spirit and scope of this invention. Static control means capable of interrupting and switching the excitation voltage may be employed in place of the field contractor 16 and the control relay 155. Logic elements of the NOR type have been shown, but it is to be understood that other logic elements may be used to accomplish the same results. The synchronous motor chosen for purposes of illustration with the motor controller has been selected to be of the unity power factor type. It is readily apparent however that any other type power factor synchronous motor may be used such as 0.8 power factor leading in which case the reference comparator 130 would be adjusted to sense the deviation from 0.8 rather than unity as hereinbefore described. For example, assume the operating limits to be: boost field at 0.95 lagging power factor ($e_x=5$ volts) and remove the boost voltage EB at 0.7 leading power factor ($e_{dc}=20$ volts). Thus the Zener diode 136 is set to break down at $e_x=5$ volts and Zener diode 135 at 20 volts by the tap connectors 134 and 133 respectively.

The output of the FLIP-FLOP 150 may be amplified and used to energize the control relay as shown in FIG. 4 or it may energize indicator lights, an audible alarm, or other load.

It is readily apparent that the present invention provides a power factor sensing circuit which not only measures the deviation of power factor from unity but which can with appropriate instruments directly measure the inverse of this value and hence result in a direct reading of the power factor. The present invention may be used with a voltmeter as the indicating instruments, as a power factor indicator. Additionally, a determination of the power factor sense is obtained, leading or lagging. Such a circuit is readily adaptable to sensing power factor on the alternating current power line. The present invention may be used to signal or initiate corrective action if the power factor deviates from preset limits. Such corrective action may be the switching of capacitor banks on a power supply to avoid power factor penalty, and the like.

These alterations and substitutions are merely by way of example. Although a particular embodiment of the invention has been shown for the purpose of illustration, it is to be understood that the invention is not limited to the specific arrangement shown, but includes all equivalent embodiments, modifications and substitutions within the spirit and scope of this invention.

I claim as my invention:

1. A power factor sensing circuit for an alternating current line comprising; first means for deriving a first signal proportional to the deviation of the power factor of said alternating current line from a reference value; first and second output lines; gating means operatively connecting said first means to said first and said second output lines; and third means for providing a gating signal functionally related to the slope and polarity of the line current and the polarity of the line voltage of said alternating current line; said gating means selectively allowing said first signal to said first and said second output lines in accordance with said gating signal.

2. A power factor sensing circuit for an alternating current line comprising; first means for providing a pulse having a width proportional to the deviation of the power factor of said alternating current line from a predetermined value; second means for converting said pulse to a first signal having a magnitude proportional to the width of said pulse; first and second output lines; means for providing a gating signal functionally related to the slope and polarity o fthe line current and the polarity of the line voltage; and gating means operatively connecting said second means to said first and said second output lines for selectively allowing said first signal to said first and said second output lines in accordance with said gating signal.

3. Power factor sensing apparatus for an alternating current line comprising; first means for deriving a first signal in phase with the line voltage; second means for deriving a second signal in phase with the line current; pulse coincident network means for providing a pulse having a width responsive to the time difference between said first and said second signals; slope measuring network means for providing a slope signal functionally related to the slope of the second signal; fifth means for providing an analog signal having a magnitude proportional to the time duration of said pulse; output circuit means for said apparatus; gating means operatively connecting said fifth means to said output circuit means; and means for providing a gating signal to selectively open said gating means in response to the simultaneous occurrence of said slope signal and a predetermined polarity of said first signal and said second signal.

4. Power factor sensing apparatus for an alternating current line comprising; means for deriving a first signal proportional to the deviation of power factor of said alternating current line from unity; comparator means for providing a second signal when said first signal exceeds a predetermined value; output circuit means for said apparatus; gating means operatively connecting said comparator means to said output circuit means; and means for selectively opening said gating means in accordance with the sense of said power factor.

5. Power factor sensing apparatus for an alternating current line comprising; means for deriving a first signal in phase with the line voltage; means for deriving a second signal in phase with the line current; pulse coincident network means for providing a pulse having a width responsive to the time difference between said first and said second signals; means for providing an analog signal having a magnitude proportional to the time duration of said pulse; comparator means for providing a fourth signal when said analog signal exceeds a predetermined value for leading power factor and for providing a fifth signal when said analog signal exceeds a second predetermined value for lagging power factor; means for providing a gating signal functionally related to the polarity of said first signal and said second signal and the slope of the line current of said alternating current line; output circuit means for said apparatus; and gating means operably connecting said comparator means to said output circuit means for selectively allowing said fourth signal and said fifth signal to said output circuit means in accordance with said gating signal.

6. Power factor sensing apparatus for an alternating current line comprising; means for deriving a first signal in phase with the line voltage; means for deriving a second signal in phase with the line current; pulse coincident network means for providing a pulse having a width responsive to the time difference between said first and said second signals; means for providing an analog signal having a magnitude proportional to the time duration of said input pulse; comparator means for providing a fourth signal when said analog signal exceeds a predetermined value for leading power factor and for providing a fifth signal when said analog signal exceeds a second predetermined value for lagging power factor; means for providing a gating signal functionally related to the polarity of said first signal and said second signal and the slope of the line current of said alternating current line; output circuit means for said apparatus; and gating means operably conecting said comparator means to said output circuit means for selectively allowing said fourth signal and said fifth signal to said output circuit means in accordance with said gating signal; said output circuit means having an output state dependent on the last in time of the signals supplied to said output circuit means.

7. Power factor sensing apparatus for a dynamoelectric machine including a winding having a terminal adapted to be connected to an alternating current power line; first means for providing a first data signal when the power factor of said winding exceeds a preselected reference for a leading sense and for providing a second data signal when said power factor of said winding exceeds a preselected reference for a lagging sense; circuit means having an output state responsive to the last received of a plurality of data signals; gating means operatively connecting said first means to said circuit means; gating signal means having a plurality of input conditions which must be satisfied to produce the gating signal, the first one of said input conditions representing the polarity of the line current, a second one of said input conditions representing the polarity of the line voltage; a third one of said input conditions comprising a predetermined sense of the derivative of the winding current; said gating means being responsive to said gating signal for allowing said first data signal from said first means to said circuit means and responsive to the absence of said gating signal for allowing said second data signal from said first means to said circuit means.

8. Power factor sensing apparatus for a dynamoelectric machine including a winding and winding terminals adapted to be connected to an alternating current power line; said circuit comprising, pulse coincident network means having first and second input conditions which must be satisfied to produce a pulse output, said first input condition representing a predetermined polarity of said winding terminal voltage, said second input condition representing a predetermined polarity of said terminal current; the width of said pulse output being proportional to the length of time when said input conditions are simultaneously present; pulse width to voltage signal converter means responsive to the width of said pulse output for providing an analog signal; reference comparator means providing an excessive leading power factor signal when said analog signal exceeds a first predetermined reference and providing an excessive lagging power factor signal when said analog signal exceeds a second predetermined reference; circuit means including a first and a second input means and having an output whose state is dependent on which of its input means is last subjected to a signal; gating means operatively connecting said reference comparator means to said circuit means so that the excessive leading power factor signal is connected to said first input means and the excessive lagging power factor signal is connected to said second input means; and an AND element for producing a gating signal in response to the polarity of the line current, the polarity of the line voltage, and a predetermined sense of the derivative of said line current; said gating means being responsive to said gating signal for allowing said excessive leading power factor signal to said first input means and responsive to the absence of said gating signal for allowing said excessive lagging power factor signal to said second input means.

9. Power factor sensing apparatus for a dynamoelectric machine including a winding and winding terminals adapted to be connected to an alternating current power line; said circuit comprising; pulse coincident network means for producing a pulse output in response to first and second conditions respectively representing a predetermined polarity of said winding terminal voltage and a predetermined polarity of said terminal current; the width of said pulse output being proportional to the length of time when said conditions are simultaneously present; pulse width to voltage signal converter means responsive to the width of said pulse output for providing an analog signal; reference comparator means providing an excessive leading power factor signal when said analog signal exceeds a first predetermined reference and providing an excessive lagging power factor signal when said analog signal exceeds a second predetermined reference; circuit means including a first and a second input means and having an output whose state depends on which of its input means is last subjected to a signal; gating means operatively connecting said reference comparator means to said circuit means so that the excessive leading power factor signal is connected to said first input means and the excessive lagging power factor signal is connected to said second input means; and an AND element for producing a gating signal in response to first, second and third conditions respectively representing the polarity of the line current, the polarity of the line voltage, and a predetermined sense of the derivative of said line current; means for filtering said gating signal over a full cycle of the supply frequency; said gating means being responsive to said filtered gating signal for allowing said excessive leading power factor signal to said first input means and responsive to the absence of said gating signal for allowing said excessive lagging power factor signal to said second input means.

10. Power factor sensing apparatus for a dynamoelectric machine including a winding having terminals adapted to be connected to an alternating current power source; said circuit comprising, means for providing a line voltage signal in phase with the line to line voltage of said power source; means for providing a terminal current signal in phase with the terminal current of said winding; pulse coincident network means providing an output pulse during the simultaneous occurrences of said line voltage signal being of negative polarity and said terminal current signal being of positive polarity; means for converting said output pulse to an analog signal proportional to the time length of said output pulse; reference comparator means for comparing said analog signal to a first predetermined value and provide a first output signal when said analog signal exceeds said first predetermined value, said reference comparator means providing a second output signal when said analog signal exceeds a second predetermined reference; circuit means having an output state responsive to the last of a plurality of inputs; gating means operatively connecting said reference comparator means to said circuit means; gating signal means having a plurality of input conditions which must be satisfied to produce a gating signal, a first one of said input conditions comprising the line current to be of negative polarity and the line voltage to be of positive polarity, a second one of said input conditions requiring the derivative of the line current with respect to time to be of negative sense; said gating means allowing said first output signal to said circuit means when said gating signal is present and allowing said second output signal to said circuit means in the absence of said gating signal.

11. The power factor sensing apparatus of claim 10 wherein said machine includes a field winding adapted to be connected to a normal excitation source and a boosting excitation source; switching means for controlling the application of said normal excitation source to said field winding; and other switching means responsive to the output state of said circuit means for controlling the application of said boosting excitation source to said field winding.

12. Power factor sensing apparatus for an alternating current line comprising first means for providing a first signal which is a function of deviation of the power factor of said line from a reference point, an output line, second means for providing a second signal which is a function of a particular sense of said power factor, and third means responsive to said second signal for passing said first signal to said output line.

13. The combination as in claim 12 wherein said second means comprises current responsive means having an output whose condition is dependent on the polarity of the line current, voltage responsive means having an output whose condition depends on the polarity of the line voltage, current slope responsive means having an output whose condition is dependent on the sense of the slope of the line current, and means responsive to the output conditions of said voltage responsive means, said current responsive means, and said slope responsive means for providing said second signal.

14. Power factor sensing apparatus for an alternating current line, said apparatus comprising means for providing a first signal which is a function of deviation of the power factor of said line from a reference point, a circuit having first and second operational modes, power factor sense detecting means having an output condition depending on the sense of said power factor, and means responsive to said first signal and the output condition of said sense detection means for selectively operating said circuit in one or the other of its modes depending on the sense of said power factor.

15. The combination of claim 14 wherein said power factor sense detecting means comprises current responsive means having an output whose condition is dependent on the polarity of the line current, voltage responsive means having an output whose condition is dependent on the line voltage, current slope responsive means having an output whose condition depends on the sense of the slope of the line current, and means responsive to said voltage responsive means, said current responsive means, and said slope responsive means for determining the output condition of said power factor sense detecting means.

16. Power factor sensing apparatus for an alternating current line comprising means for providing a first signal proportional to the deviation of the power factor of said line from a reference point, first and second output lines, power factor sense detecting means having an output condition depending on the sense of said power factor, and means responsive to said first signal and the output condition of said sense detecting means for selectively passing said first signal to one or the other of said output lines in accordance with the sense of said power factor, depending on the sense of said power factor.

17. Power factor sensing apparatus for an alternating current line, said apparatus comprising first means for providing a first signal when the power factor of said line deviates more than a predetermined amount from a predetermined reference, a circuit having first and second operational modes, power factor sense detecting means having an output condition depending on the sense of said power factor, and means responsive to said first signal and to the output condition of said sense detection means for selectively operating said output circuit in one or the other of its modes depending on the sense of said power factor.

18. Power factor sensing apparatus for an alternating current line comprising means for providing a first signal responsive to deviation of the power factor of said line from a reference point, first and second output lines, means for providing a second signal which is a function of a particular sense of said power factor, and a gating means interposed between said first means and said output lines for selectively passing said first signal to one or the other of said output lines in accordance with the presence or absence of said second signal.

19. Power factor sensing apparatus for an alternating current line comprising means for providing a first signal responsive to deviation of the power factor of said line from a reference point, means for providing a second signal when said first signal exceeds a predetermined value, an output line, means for providing a third signal which is a function of a particular sense of said power factor, and gating means responsive to said third signal for passing said second signal to said output line.

20. Power factor sensing apparatus for an alternating current line comprising first means for deriving a first signal which is a function of the phase of the line voltage, second means for deriving a second signal which is a function of the phase of the line current, means responsive to said first and second signals for providing a pulse having a width which is a function of the phase angle between the voltage and current of the line, means for providing a third signal having a magnitude which is a function of the width of said pulse, power factor sense detecting means having an output condition depending on the sense of the power factor of said line, a circuit having first and second modes of operation, and means responsive to said third signal and the output condition of said sense detecting means for selectively operating said circuit in one or the other of its modes depending on the sense of said power factor.

21. The combination of claim 20 wherein said power factor sense detecting means comprises current responsive means having an output whose condition is dependent on the polarity of the line current, voltage responsive means having an output whose condition is dependent on the line voltage, current slope responsive means having an output whose condition depends on the sense slope of the line current, and means responsive to said voltage responsive means, said current responsive means, said slope responsive means for determining the output condition of said power factor sense detecting means.

22. Power factor sensing apparatus for an alternating current line comprising means for deriving a first signal which is a function of the phase of the line voltage, means for deriving a second signal which is a function of the phase of the line current, means responsive to said first and second signals for providing a pulse having a width which is a function of the phase angle between the voltage and current of the line, means for providing a third signal having a magnitude which is a function of the width of said pulse, means responsive to said third signal for providing fourth and fifth signals in response respectively to first and second amounts of deviation of the power factor of said line from a predetermined reference, power factor sense detecting means having an output condition dependent on the sense of said power factor, a circuit having first and second modes of operation, and means responsive to said fourth and fifth signals and the output condition of said power factor sense detecting means for selectively operating said circuit in one or the other of its modes depending on the sense of said power factor.

23. The combination of claim 22 wherein said power factor sense detecting means comprises current responsive means having an output whose condition is dependent on the polarity of the line current, voltage responsive means having an output whose condition is dependent on the line voltage, current slope responsive means having an output whose condition depends on the sense of the slope of the line current, and means responsive to said voltage responsive means, said current responsive means, and said slope responsive means for determining the output condution of said power factor sense detecting means.

24. Power factor sensing apparatus for an alternating current line comprising means for deriving a first signal which is a function of the phase of the line voltage, means for deriving a second signal which is a function of the phase of the line current, means responsive to said first and second signals for providing a pulse having a width which is a function of the phase angle between the line voltage and current of the line, means for providing a third signal having a magnitude which is a function of the width of said pulse, means responsive to said third signal for providing fourth and fifth signals in response respectively to first and second amounts of deviation of the power factor of said line from a predetermined reference, power factor sense detecting means having first and second output conditions respectively representing leading and lagging power factor, an output circuit for said apparatus, means responsive to said fourth signal and said first output condition of said power factor sense detecting means for applying to said output circuit a signal representing the fourth signal, and means responsive to said fifth signal and said second output condition of the power factor sense detecting means for applying to said output circuit a signal representing said fifth signal.

25. The combination of claim 24 wherein said power factor sense detecting means comprises current responsive means having an output whose condition is dependent on the polarity of the line current, voltage responsive means having an output whose condition is dependent on the line voltage, current slope responsive means having an output whose condition depends on the sense of the slope of the line current, and means responsive to said voltage responsive means, said current responsive means, and said slope responsive means for determining the output condition of said power factor sense detecting means.

26. Power factor sensing apparatus for an electrodynamic machine having an excitation winding, said apparatus comprising means for providing a first signal responsive to deviation of the power factor of said machine from a reference point, an excitation source, switch means for connecting said excitation source to said winding, an output line, means for providing a second signal which is a function of a particular sense of said power factor, gating means responsive to said second signal for passing said first signal to said output line, and means responsive to said output line for affecting said switch means.

27. Power factor sensing apparatus for an electrodynamic machine having an excitation winding, said apparatus comprising means for providing a first signal responsive to deviation of the power factor of said machine from a reference point, an excitation source, switching means having respective first and second inputs for selectively connecting and disconnecting said excitation source to and from said winding in response to receipt of a signal at the first input and the second input respectively, means for providing a second signal which is a function of a particular sense of said power factor, and a gating means interposed between said first means and said switch means for selectively passing said first signal to one or the other of said switch means inputs in accordance with the presence or absence of said second signal.

28. Power factor sensing apparatus for an electrodynamic machine having an excitation winding, said apparatus comprising means for providing a first signal which is a function of deviation of the power factor of said machine from a predetermined reference, power factor sense detecting means having an output condition depending on the sense of said power factor, an excitation source, and means responsive to said first signal and to the output condition of said sense detection means for selectively connecting or disconnecting said excitation source to and from said winding depending on the sense of said power factor.

No references cited.